United States Patent Office 2,880,232
Patented Mar. 31, 1959

2,880,232
POLYNITRO AMINO DIALKANOATE

Milton B. Frankel, Pasadena, and Karl Klager, Monrovia, Calif., assignors to Aerojet-General Corporation, Azusa, Calif., a corporation of Ohio No Drawing. Application October 22, 1956
Serial No. 617,669

10 Claims. (Cl. 260—482)

This invention relates to new compositions of matter and a method for their preparation. In particular this invention relates to amino esters having the general formula:

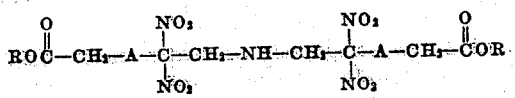

wherein R is an alkyl radical and A is an alkylene radical.

This application is a continuation-in-part of our copending U.S. patent application Serial No. 416,381, filed March 15, 1954, now abandoned.

The compounds of this invention are readily prepared by condensing geminal dinitro-containing hydroxy esters with ammonia in accordance with the general reaction scheme set forth below:

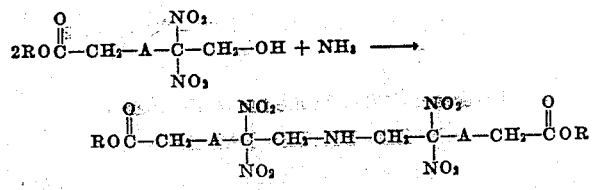

wherein R and A are as defined above.

For purposes of convenience we have found it preferable to use an ammonium salt of a weak organic acid rather than gaseous ammonia.

The hydroxy esters used as starting materials are obtained by condensing a nitronate salt of an ω-geminal dinitro-containing ester with formaldehyde, as described in the J. Org. Chem., vol. 16, p. 161, 1951.

The ω-geminal dinitro esters are obtained by condensing an acrylate ester with dinitro methane. After the initial ester 4,4-dinitrobutyrate is formed, the carbon chain may be lengthened by conventional methods.

In the practice of this invention, the hydroxy ester may also be produced in situ and the amino polynitro esters obtained by condensing formaldehyde with the nitronate salt of an ω-geminal dinitro ester in the presence of ammonia, as illustrated in Example II.

To more clearly illustrate our invention, the following examples are presented. It is to be understood, however, that these examples are presented merely as a means of illustration and are not intended to limit the scope of the invention in any way.

EXAMPLE I

*Preparation of dimethyl 4,4,8,8-tetranitro-6-aza-undecanedioate from methyl 4,4-dinitro-5-hydroxyvalerate*

In a 250 ml. Erlenmeyer flask was placed a solution of 30.0 gm. (0.39 mole) of ammonium acetate in 75 ml. of water and 30.0 gm. (0.135 mole) of methyl 4,4-dinitro-5-hydroxyvalerate. The solution was heated on the steam bath for 10–15 minutes. On cooling a cream-colored solid separated; it was collected, washed with water and dried. The yield of dimethyl 4,4,8,8-tetranitro-6-aza-undecanedioate was 25.4 gm. (88.6%), M.P. 65–69° C. The impact stability of the compound exceeded 100 cm./2 kg.

EXAMPLE II

*Preparation of dimethyl 4,4,8,8-tetranitro-6-aza-undecanedioate from sodium salt of methyl 4,4-dinitrobutyrate*

In a 5-liter 3-necked flask, fitted with a thermometer, mechanical stirrer, and dropping funnel, was placed 500 ml. of concentrated ammonium hydroxide, 800 ml. of water, and 500 ml. of glacial acetic acid. The temperature was allowed to rise to 60–70° C. At this temperature a solution of 1000 gm. (equivalent to 850 gm. or 3.97 moles of dry salt containing 15% moisture) of the sodium salt of methyl 4,4-dinitrobutyrate, 2000 ml. of water, and 324 gm. of 37% formalin was added over a period of 15 minutes. The reaction mixture was stirred at 60° C. for 1 hour; on cooling to 10° C. a solid precipitated. The product was collected, washed well with cold water, and dried in vacuo over potassium hydroxide, 480 gm. (56.8%).

We have also found that methyl 6,6-dinitro-7-hydroxy-heptanoate, ethyl 5,5-dinitro-6-hydroxy-hexanoate, and propyl 3,3-dinitro-4-hydroxy-butanoate, react in a similar manner to yield the corresponding di-substituted aza compounds, namely, dimethyl 6,6,10,10-tetranitro-8-azapentadecanedioate, diethyl 5,5,9,9,-tetranitro-7-aza-tridecanedioate, and dipropyl 3,3,7,7-tetranitro-5-aza-nonanedioate.

It is apparent from the above discussion that any member of the class of amino polynitro esters disclosed may be prepared by merely condensing an appropriate geminal dinitro hydroxy ester in the presence of ammonia in accordance with the teachings of this invention.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

The nitro compounds of our invention can also be used as ballistic modifiers for conventional demolition and blasting explosives. For example, a 50–50 mixture of a nitro compound of our invention and cellulose nitrate provides an excellent explosive which can be detonated by conventional blasting caps.

We claim:
1. As new compositions of matter, the amino polynitro esters having the general formula:

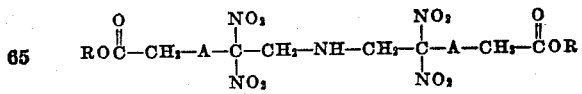

wherein R is a lower alkyl radical and A is a lower alkylene radical.

2. As a new composition of matter, dimethyl 4,4,8,8- tetranitro-6-aza-undecanedioate having the structural formula:

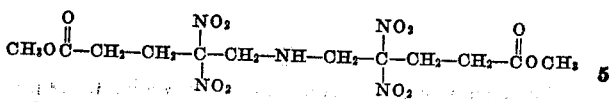

3. The method of preparing amino polynitro esters having the general formula:

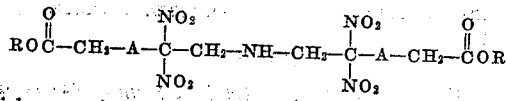

which comprises condensing ammonia with an ester having the general formula:

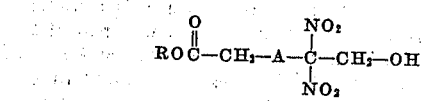

wherein R is a lower alkyl radical and A is a lower alkylene radical.

4. The method of preparing amino polynitro esters having the general formula:

which comprises condensing ammonia with formaldehyde and a nitronate salt of an ω-geminal dinitro ester having the general formula

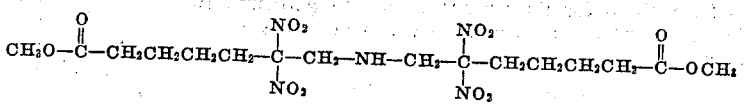

wherein R is a lower alkyl radical and A is a lower alkylene radical.

5. The method of preparing dimethyl 4,4,8,8-tetranitro-6-aza-undecanedioate which comprises condensing methyl 4,4-dinitro-5-hydroxy-valerate with ammonia.

6. The method of claim 5 in which the ammonia is introduced as ammonium acetate.

7. The method of preparing dimethyl 4,4,8,8-tetranitro-6-aza-undecanedioate which comprises condensing the sodium salt of methyl 4,4-dinitrobutyrate in the presence of formaldehyde and ammonia.

8. As a new composition of matter, dimethyl 6,6,10,10-tetranitro-8-aza-pentadecanedioate having the structural formula:

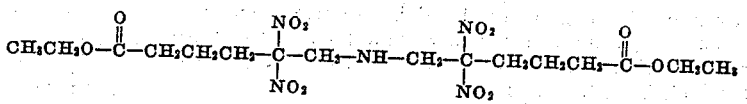

9. As a new composition of matter, diethyl 5,5,9,9-tetranitro-7-aza-tridecanedioate having the structural formula:

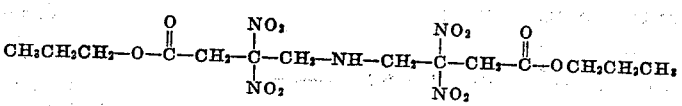

10. As a new composition of matter, dipropyl 3,3,7,7-tetranitro-5-aza-nonanedioate having the structural formula:

$$CH_3CH_2CH_2-O-\underset{\underset{\displaystyle}{\|}}{C}-CH_2-\underset{\underset{NO_2}{|}}{\overset{\overset{NO_2}{|}}{C}}-CH_2-NH-CH_2-\underset{\underset{NO_2}{|}}{\overset{\overset{NO_2}{|}}{C}}-CH_2-\underset{\underset{\displaystyle}{\|}}{C}-OCH_2CH_2CH_3$$

References Cited in the file of this patent
UNITED STATES PATENTS 2,731,460     Schenck et al. _____ Jan. 17, 1956

OTHER REFERENCES

Klager: J. Org. Chem., vol. 16, pp. 161–164 (1951).